C. O. THOMAS, Jr.
FIELD KITCHEN.
APPLICATION FILED MAY 5, 1917.

1,276,995.

Patented Aug. 27, 1918.

WITNESSES:
C. S. Evans
J. B. Gardner

INVENTOR.
C. O. THOMAS JR.
BY White & Prost
HIS ATTORNEYS

UNITED STATES PATENT OFFICE.

CHARLES O. THOMAS, JR., OF THE UNITED STATES ARMY.

FIELD-KITCHEN.

1,276,995.                    Specification of Letters Patent.        Patented Aug. 27, 1918.

Application filed May 5, 1917.   Serial No. 166,611.

*To all whom it may concern:*

Be it known that I, CHARLES O. THOMAS, Jr., a citizen of the United States, and an officer in the United States Army, now stationed at Douglas, county of Cochise, State of Arizona, have invented a new and useful Field-Kitchen, of which the following is a specification.

My invention relates to portable cooking outfits for use by an army in the field.

An object of my invention is to provide a cooking outfit for a large body of men which can be condensed into a comparatively small unit of such weight and size as to be readily transported on mules or horses.

Another object of my invention is to provide portable means for quickly securing large quantities of hot water, comprising a tank having a heating coil permanently secured thereto.

The invention possesses other features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings.

Among the chief factors affecting the practical value of a field cooking outfit are its weight and size; the time and labor required to set it up or to pack it; and the results obtained from its use.

Figure 1:
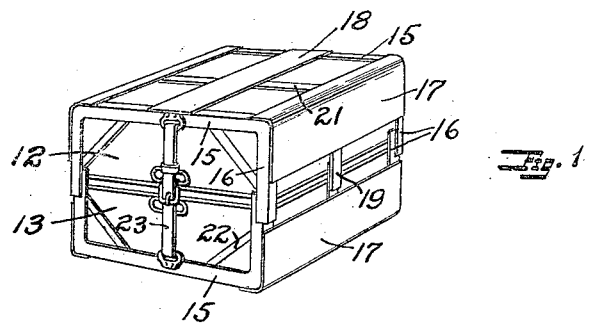
Figure 1 is a perspective view of the outfit when packed ready for transportation.

In mountainous country or under conditions where transportation must be by pack mule or pack horse, the weight and size are determined by the carrying capacity of the pack animal and the requirements for proper loading. The weight and size of my outfit suitable for the needs of 150 men is such that one complete outfit as shown in Fig. 1, can be packed on each side of a mule.

Figure 3:
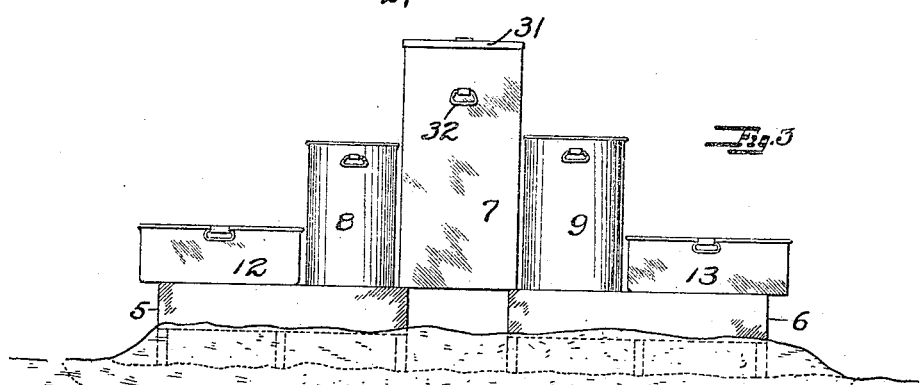
Fig. 3 is an elevation of the complete outfit when set up ready for use.

The time and labor required to pack up the outfit or to unpack it and set it up as shown in Fig. 3, is almost negligible and merely that required to place the parts in their respective positions. There are no connections to make or to take down and no small parts to be lost.

The results obtainable are of the utmost importance. Something besides mere cooking is required. It is of prime importance that the cooking utensils should be kept clean, and that is impracticable without hot water. Heating water in ordinary vessels over an open fire is a slow process and if that is the only source of hot water, its use is neglected and the health of the men is bound to suffer. With my outfit is included means for providing an abundance of hot water during the cooking of the meal. The dishes and cooking utensils may then be properly cleansed and a serious menace to the health of the men removed. It is also obvious that the provision of means for the quick heating of large quantities of water is a powerful influence in maintaining the proper standard of cleanliness in the clothing and person of men who in the field are removed from most of the conveniences of their normal life.

My field outfit consists of two grids 5 and 6, a hot water tank 7, a small boiler 8, a larger boiler 9, and roasting pans 12 and 13. A heating coil is permanently attached to the tank 7. The boilers and tank are of such size and proportion that they nest together and all slip into the roasting pans. The interior of the smaller boiler furnishes a space for plates, spoons and other small articles. The grids are of such size as to fit about the pans as a protective crate.

The grids 5 and 6 are constructed to form a support for the cooking vessels and the hot water tank so that a fire may be built thereunder, as shown in Fig. 3. Preferably the grids are straddled over a shallow trench, the bottom of which is indicated by the dotted line B, so that a larger fire space is provided. Preferably the dirt from the trench is heaped against the sides of the grids so as to coöperate with them in confining the flames under the vessels.

The grids consist of end pieces 15 preferably of angle iron, the ends of which are turned downwardly to provide legs 16. The end pieces 15 are connected by thin angle iron side pieces 17 extending well down on the legs. These pieces stiffen the structure and also serve to confine the flames under the cooking vessels. A flat piece 18 also connects the end pieces, and legs 19 formed by the downturned ends of member 21 are arranged intermediate the ends. Braces 22 set across the corners stiffen the legs 16. One of the grids is slightly smaller than the other so that its legs nest within the legs of the other, as shown in Fig. 1. When placed together, the grids form a crate for the nested utensils, keeping them together and protecting them from injury. A strap 23 passed through suitable eyes on each end of the grids retains them in position.

Figure 2:
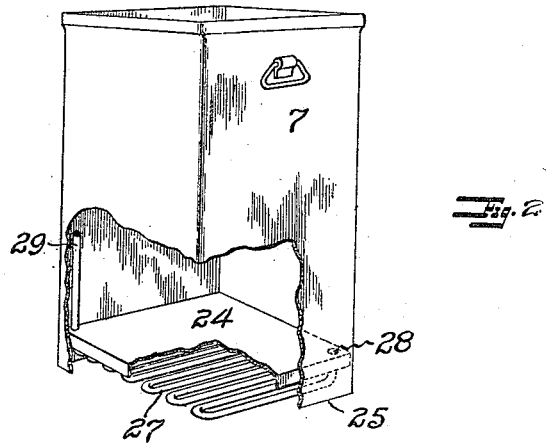
Fig. 2 is a perspective view of the hot water tank, a portion being broken away to disclose the heating coils.

The construction of the hot water tank 7 is shown in Fig. 2. The bottom 24 of the tank is set in from the edges 25 of the sides, so that a shallow recess is left under the bottom of the tank within which is arranged a heating coil 27, preferably formed of a single piece of suitably bent copper tubing. One end 28 of the coil is connected into the tank at the bottom 24 and the other end 29 of the coil extends through the bottom and upwardly a suitable distance into the tank. The coil thus provides a circuit through which the water in the tank circulates when the coil is subjected to heat, the heated water rising into the tank from one end of the coil and colder water flowing into the other end of the coil. In addition to the circulation through the coil, the heating of the water is aided by the direct action of the flames on the bottom of the tank.

Preferably the inlet 28 and the outlet 29 of the heating coil are arranged in opposite corners of the tank. A cover 31 fitting the top of the tank prevents undue loss of heat and preserves the water from contamination. It will be noted that the coil 27 is permanently fixed upon the bottom of the tank, that there are no loose parts and no connections to be made prior to use and that the coil is located within the spaces defined by the lateral sides of the tank. Except for the handles 32 which lie close to the sides, the surface of the tank is without projecting parts which are subject to injury in the rough handling to which such an outfit is necessarily subjected, and which are apt to be troublesome in packing.

When the entire outfit is set up, I prefer to space the grids apart and set the tank upon their adjacent edges as shown in Fig. 3. This leaves the grid surfaces free for cooking and fuel may be fed under the tank as well as under the grids. It is obvious, however, that when hot water only is wanted, the tank may be set upon the surface of one grid alone.

I claim:

1. A field outfit comprising a pair of grids adapted to be nested together, a tank adapted to be inclosed by said nested grids, and having a bottom spaced from the edges of its lateral sides, and a heating coil arranged upon the bottom of said tank within the space defined by said bottom and the lateral sides thereof.

2. A field outfit comprising a pair of grids adapted to be nested together, roasting pans, boilers and a tank adapted to be nested together and inclosed in said nested grids, and a heating coil lying adjacent the bottom of said tank and permanently secured thereto, the lateral sides of said tank extending past said coils.

3. A field outfit comprising a tank, a heating coil arranged upon the bottom of the tank, roasting pans adapted to inclose the tank, boilers adapted to nest within the tank, a pair of grids having legs adapted to slip one within the other and adapted to form a protective crate about said pans, and means for securing said grids about said pans.

4. A field outfit comprising a tank, having a bottom spaced inwardly from the edges of the sides, a heating coil arranged upon the bottom of said tank, a grid for supporting said tank above a fire, and side pieces arranged on said grid to prevent lateral spreading of said fire.

In testimony whereof, I have hereunto set my hand at Douglas, Arizona, this 24th day of April, 1917.

CHARLES O. THOMAS, Jr.

Copies of this patent may be obtained for five cents each, by addressing the "Commissioner of Patents, Washington, D. C."